US011757500B2

(12) United States Patent
Sen et al.

(10) Patent No.: US 11,757,500 B2
(45) Date of Patent: Sep. 12, 2023

(54) GENERATION OF SPATIAL MULTIPLEXING MODES FOR MULTIPLE INPUT MULTIPLE OUTPUT CHANNEL

(71) Applicant: QUALCOMM Incorporated, San Diego, CA (US)

(72) Inventors: Pinar Sen, San Diego, CA (US); Peter Gaal, San Diego, CA (US); Naga Bhushan, San Diego, CA (US); Seyong Park, San Diego, CA (US); Renqiu Wang, San Diego, CA (US); Wei Yang, San Diego, CA (US); Krishna Kiran Mukkavilli, San Diego, CA (US); Tingfang Ji, San Diego, CA (US); Muhammad Sayed Khairy Abdelghaffar, San Jose, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/453,437

(22) Filed: Nov. 3, 2021

(65) Prior Publication Data
US 2022/0182114 A1 Jun. 9, 2022

Related U.S. Application Data

(60) Provisional application No. 63/199,064, filed on Dec. 4, 2020.

(51) Int. Cl.
H04B 7/0456 (2017.01)
H04B 7/06 (2006.01)

(52) U.S. Cl.
CPC ......... *H04B 7/0478* (2013.01); *H04B 7/0482* (2013.01); *H04B 7/0639* (2013.01)

(58) Field of Classification Search
CPC ... H04B 7/0478; H04B 7/0482; H04B 7/0639
USPC .......................................... 375/262
See application file for complete search history.

(56) References Cited

U.S. PATENT DOCUMENTS

2013/0308715 A1* 11/2013 Nam ............... H04B 7/0634
375/267
2016/0087701 A1* 3/2016 Wu ................. H04B 7/0639
375/267
2019/0125310 A1* 5/2019 Takeda ............. A61B 8/5269

FOREIGN PATENT DOCUMENTS

CN 102447664 A * 5/2012 ........... H04B 7/0413

OTHER PUBLICATIONS

Kaleva et al. Downlink Precoder Design for Coordinated Regenerative Multi-User Relaying, IEEE Transactions on Signal Processing (vol. 61, Issue: 5, Mar. 2013, pp. 1215-1229 (Year: 2013).*

* cited by examiner

Primary Examiner — Leila Malek
(74) Attorney, Agent, or Firm — Harrity & Harrity, LLP

(57) ABSTRACT

Various aspects of the present disclosure generally relate to wireless communication. In some aspects, a wireless communication device may generate a Legendre precoder for transmission on a multiple-input multiple-output channel based at least in part on computing Legendre polynomials for a quantity of transmit antennas. The wireless communication device may transmit a communication using the Legendre precoder. Numerous other aspects are provided.

22 Claims, 9 Drawing Sheets

600

Ordering of modes (first 13 modes)

(0,0)
(0,1), (1,0)
(1,1)
(0,2), (2,0)
(1,2), (2,1)
(0,3), (3,0)
(2,2)
(1,3), (3,1)

Optimal precoder from SVD

Legendre precoder

GENERATION OF SPATIAL MULTIPLEXING MODES FOR MULTIPLE INPUT MULTIPLE OUTPUT CHANNEL

CROSS-REFERENCE TO RELATED APPLICATION

This patent application claims priority to U.S. Provisional Patent Application No. 63/199,064, filed on Dec. 4, 2020, entitled "GENERATION OF SPATIAL MULTIPLEXING MODES FOR MULTIPLE INPUT MULTIPLE OUTPUT CHANNEL," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for generating spatial multiplexing modes for a multiple-input multiple-output channel.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a B S via the downlink and uplink. "Downlink" or "forward link" refers to the communication link from the BS to the UE, and "uplink" or "reverse link" refers to the communication link from the UE to the BS. As will be described in more detail herein, a BS may be referred to as a Node B, a gNB, an access point (AP), a radio head, a transmit receive point (TRP), a New Radio (NR) BS, or a 5G Node B.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE, NR, and other radio access technologies.

SUMMARY

In some aspects, a method of wireless communication performed by a wireless communication device includes generating a Legendre precoder for transmission on a multiple-input multiple-output (MIMO) channel based at least in part on computing Legendre polynomials for a quantity of transmit antennas, and transmitting a communication using the Legendre precoder.

In some aspects, a wireless communication device for wireless communication includes a memory and one or more processors coupled to the memory, the one or more processors configured to generate a Legendre precoder for transmission on a MIMO channel based at least in part on computing Legendre polynomials for a quantity of transmit antennas, and transmit a communication using the Legendre precoder.

In some aspects, a non-transitory computer-readable medium storing a set of instructions for wireless communication includes one or more instructions that, when executed by one or more processors of a wireless communication device, cause the wireless communication device to generate a Legendre precoder for transmission on a MIMO channel based at least in part on computing Legendre polynomials for a quantity of transmit antennas, and transmit a communication using the Legendre precoder.

In some aspects, an apparatus for wireless communication includes means for generating a Legendre precoder for transmission on a MIMO channel based at least in part on computing Legendre polynomials for a quantity of transmit antennas, and means for transmitting a communication using the Legendre precoder.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
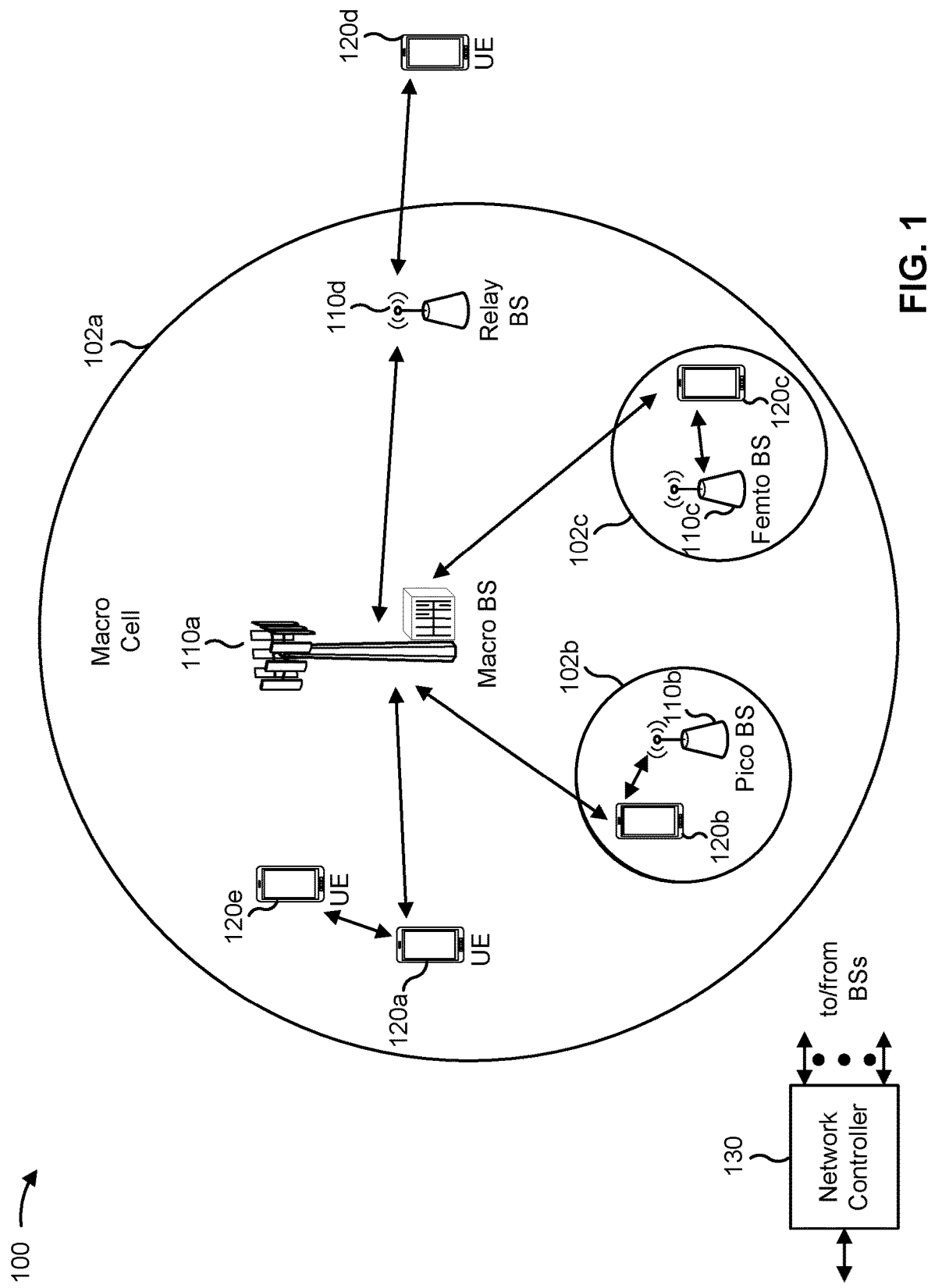
FIG. 1 is a diagram illustrating an example of a wireless network, in accordance with the present disclosure.

FIG. 1 is a diagram illustrating an example of a wireless network 100 in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, or a transmit receive point (TRP). Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, or a virtual network using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, or a relay.

Wireless network 100 may be a heterogeneous network that includes BSs of different types, such as macro BSs, pico BSs, femto BSs, and/or relay BSs. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, and/or an air interface. A frequency may also be referred to as a carrier, and/or a frequency channel. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
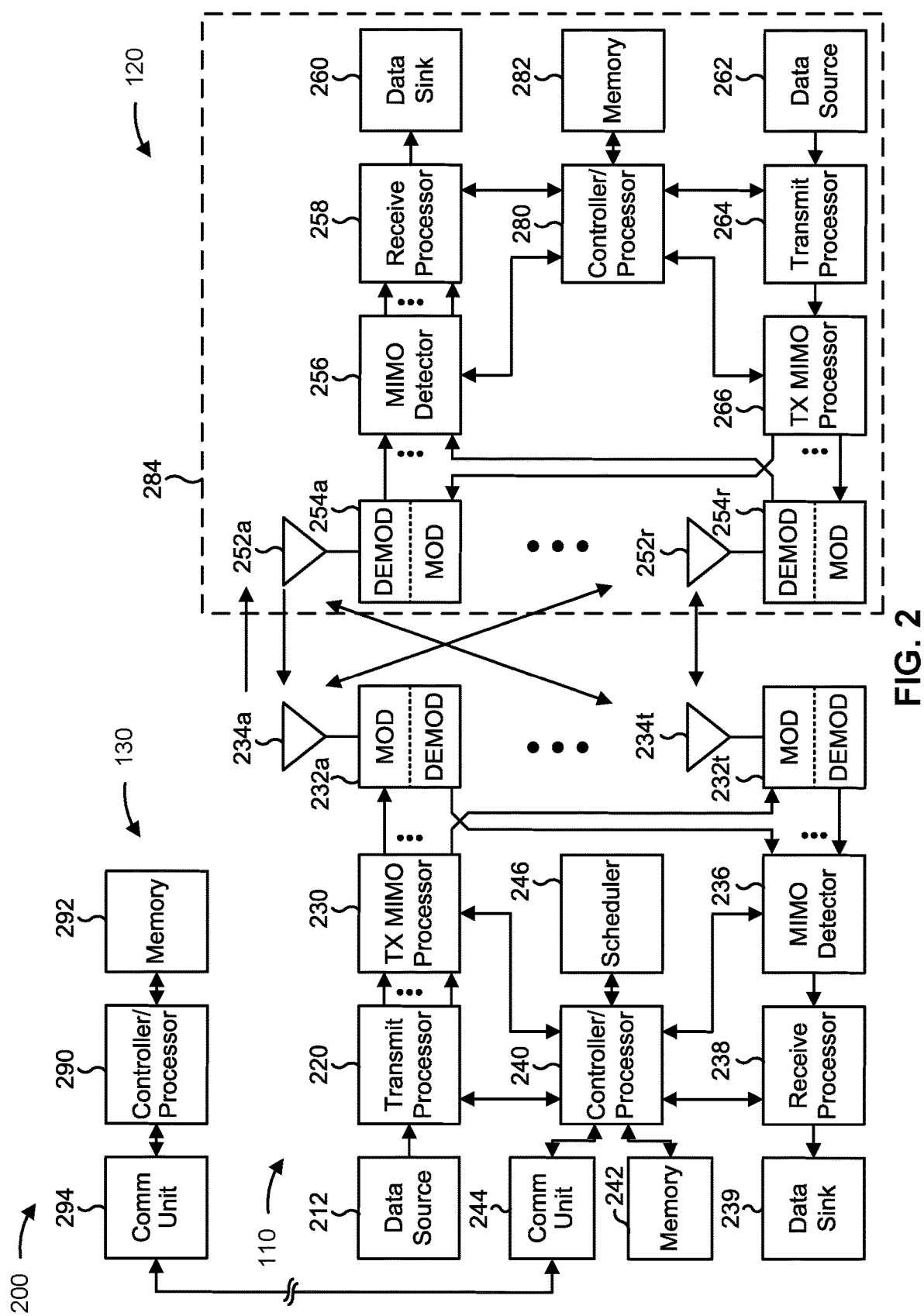
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, upper layer signaling) and provide overhead symbols and control symbols. Transmit processor 220 may also generate reference symbols for reference signals (e.g., a cell-specific reference signal (CRS), a demodulation reference signal (DMRS)) and synchronization signals (e.g., the primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), and/or CQI, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4-9).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4-9).

Controller/processor 240 of base station 110, controller/processor 280 of UE 120, and/or any other component(s) of FIG. 2 may perform one or more techniques associated with generating spatial multiplexing modes for a MIMO channel, as described in more detail elsewhere herein. In some aspects, the wireless communication device described herein is the base station 110, is included in the base station 110, or includes one or more components of the base station 110 shown in FIG. 2. In some aspects, the wireless communication device described herein is the UE 120, is included in the UE 120, or includes one or more components of the UE 120 shown in FIG. 2. For example, controller/processor 240 of base station 110, controller/processor 280 of UE 120, and/or any other component(s) of FIG. 2 may perform or direct operations of, for example, process 800 of FIG. 8 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of base station 110 and/or UE 120, may cause the one or more processors, UE 120, and/or base station 110 to perform or direct operations of, for example, process 800 of FIG. 8 and/or other processes as described herein. In some aspects, executing instructions may include running the instructions, converting the instructions, compiling the instructions, and/or interpreting the instructions, among other examples.

In some aspects, the wireless communication device includes means for generating a Legendre precoder for transmission for a MIMO channel based at least in part on computing Legendre polynomials for a quantity N of transmit antennas, and means for transmitting a communication using the Legendre precoder. In some aspects, the means for the wireless communication device to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, the means for the wireless communication device to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the wireless communication device includes means for dividing an interval [−1 1] into N equally separated points, and means for computing a Legendre polynomial at each point on the interval to form a precoder matrix.

In some aspects, the wireless communication device includes means for orthogonalizing the precoder matrix.

In some aspects, the wireless communication device includes means for normalizing the precoder matrix based at least in part on a line of sight (LOS) channel estimate.

In some aspects, the wireless communication device includes means for dividing an interval [−1 1] into $N_x \times N_y$ equally separated points, and means for computing a Legendre polynomial at each point on the interval to form the precoder matrix.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
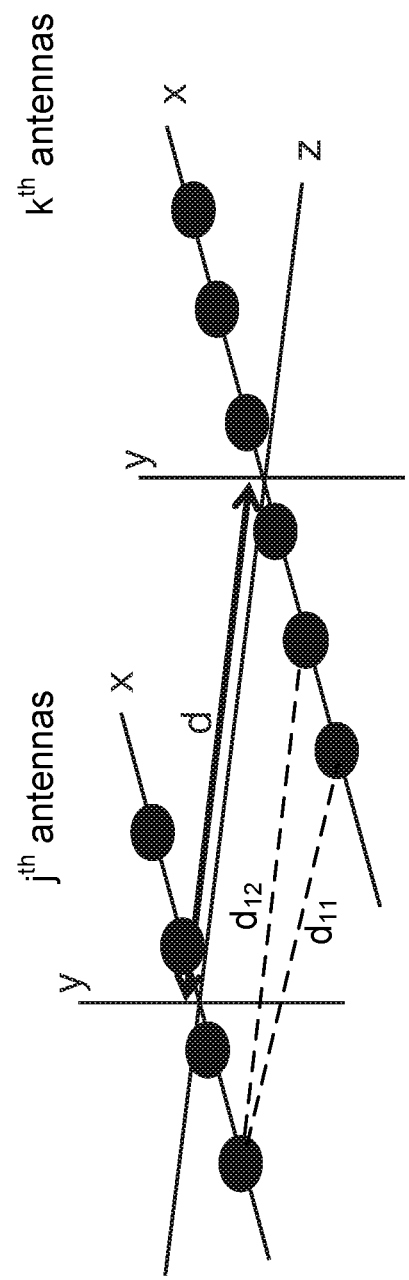
FIG. 3 is a diagram illustrating an example of one-dimensional antenna arrays, in accordance with the present disclosure.

FIG. 3 is a diagram illustrating an example 300 of one-dimensional antenna arrays, in accordance with the present disclosure.

Example 300 shows two linear, co-polarized antenna arrays that face each other in a clear LOS scenario between two wireless communication devices. A transmitting device may have N transmit antennas, and a receiving device may have M receive antennas. Example 300 shows that the transmitting device has, for example, a linear array of four transmit antennas, and the receiving device has, for example, a linear array of six receive antennas. The centers of the antenna arrays may aligned and separated by a distance d.

A MIMO LOS channel estimate H for a MIMO channel may be calculated by the transmitting device, using a relation of the form:

$$H \sim C \frac{\exp\left(-i2\pi \frac{d_{jk}}{\lambda}\right)}{d_{jk}/\lambda}.$$

The channel estimate matrix H includes values for each distance $d_{jk}$ between a transmit antenna to each receive antenna, repeated for each transmit antenna. For example, distances $d_{11}$ and $d_{12}$ are shown from a first transmit antenna to first and second receive antennas. The constant C is from a channel model, and i indicates an imaginary value.

The transmitting device may use one or more precoders for LOS transmission on a MIMO channel. The precoders may involve spatial modes that correspond to orthogonal data streams that are multiplexed. The precoders may be singular value decomposition (SVD) precoders, and the first few columns of an optimal precoder from SVD may be called singular modes. However, SVD precoders may involve determining a distance between antennas of the transmitting device and antennas of a receiving device. Determining the distance consumes time, power, processing resources, and signaling resources. Without determining the distance, an SVD precoder may not be accurate, and degraded performance may waste time, power, processing resources, and signaling resources.

According to various aspects described herein, a transmitting device may generate a Legendre precoder without using an LOS distance measurement, and use the Legendre precoder for transmission. The transmitting device, or another device that configures the transmitting device, may generate a Legendre precoder by computing Legendre polynomials based at least in part on a quantity N of transmit antennas of the transmitting device. Legendre precoders may be applicable to distances greater than an aperture distance for an array of the transmit antennas and applicable for intermediate to far field distances.

Legendre precoders may have similar accuracy and performance as compared to the SVD or other single mode precoders, while conserving time, power, processing resources, and signaling resources otherwise consumed by determining and using LOS distance measurements. If a distance measurement is not available, the transmitting device may still use an accurate precoder (Legendre precoder) and conserve resources that would otherwise be wasted using a precoder that suffers from inaccuracy if the precoder is not calculated with an LOS distance measurement.

In some aspects, the transmitting device may generate a Legendre precoder by calculating Legendre polynomials of degree n=0, 1, 2, 3, . . . computed at points x on an interval between −1 and 1, or where x∈[−1 1]. The equation for a Legendre polynomial has the form:

$$P(n, x) = \frac{1}{2^n n!} \frac{d^n}{dx^n}(x^2 - 1)^n$$

To compute the Legendre precoder, the transmitting device may divide the interval [−1 1] into N equally separated points x, and compute a Legendre polynomial at each point x. N is the quantity of transmit antennas for the transmitting device. The transmitting device may generate the Legendre polynomial at each point x using an equation of the form:

$$P(n, x) = -1 + k\frac{2}{N-1}$$

In this equation, n=0, . . . , N−1, and k=0, 1, . . . , N−1. The Legendre polynomials may form a precoder vector $p_n$, which may be defined as:

$$p_n = \begin{bmatrix} P(n, -1) \\ \vdots \\ P(n, 1) \end{bmatrix},$$

where the first row may be column headers that indicate a spatial mode for a data stream, and the rows (starting on the second row) may indicate precoding coefficients based at least in part on the computed Legendre polynomials. The data streams may be orthogonal to one another.

In some aspects, the transmitting device may orthogonalize the precoder matrix. For example, the transmitting device may use a Gram-Schmidt algorithm to orthogonalize the columns of the precoder matrix with respect to each other. This may include applying a linear operation on the columns to ensure that the columns are orthogonal to each other and still span the same subspace. The columns may be linearly independent vectors.

For transmit power control, the transmitting device may normalize precoder vectors using an equation of the form:

$$\text{normalized } p_n = p_n / \sqrt{(p_n)^H * p_n},$$

where H represents an LOS channel estimate, similar to the example matrix H described above. In some aspects, precoder vectors may be normalized using a matrix transposition (e.g., Hermitian). In some aspects, the transmitting device may normalize orthogonalized precoder vectors or orthogonalize normalized precoder vectors.

The transmitting device may generate Legendre precoder P as $$P = [p_0 \; p_1 \; p_2 \; \ldots \; p_{N-1}]$$

The generated Legendre precoder may be comparable to an optimal precoder (e.g., SVD, single mode) for one-dimensional linear arrays. The Legendre precoder may have normalized and/or orthogonalized vectors.

As indicated above, FIG. 3 is provided as an example. Other examples may differ from what is described with regard to FIG. 3.

Figure 4:
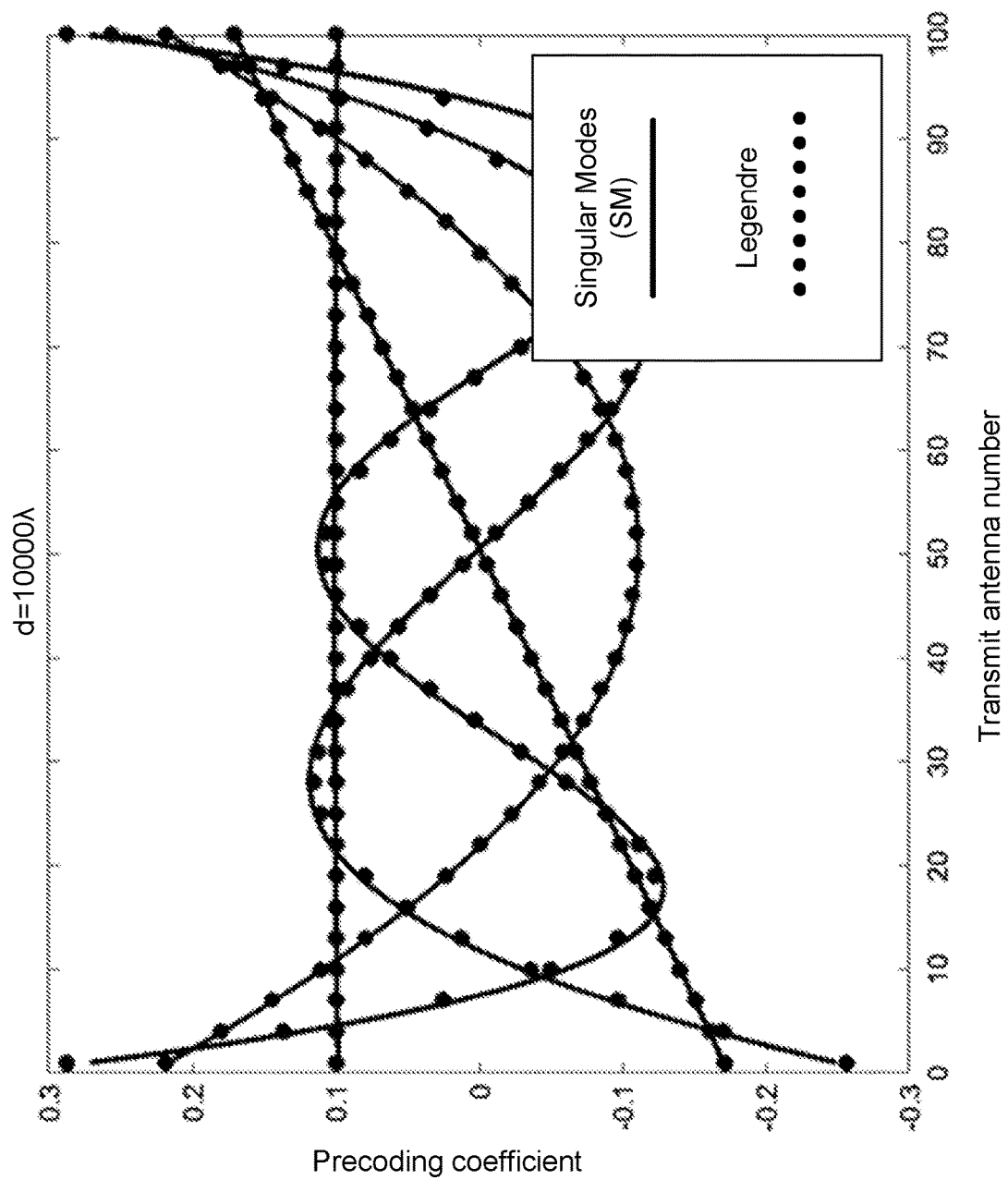
FIG. 4 is a diagram illustrating an example of a comparison of a Legendre precoder and an optimal recorder, in accordance with the present disclosure.

FIG. 4 is a diagram illustrating an example 400 of a comparison of a Legendre precoder and an optimal recorder, in accordance with the present disclosure.

Example 400 is a graph of precoding coefficients in relation to a number of transmit antennas at a distance of 10000λ, where λ is a wavelength for a transmitting frequency, and the transmit antennas may be separated by 0.5λ. The solid lines represent precoding coefficients for five single mode precoders. The dots represent precoding coefficients for five orders (0-4) of Legendre polynomials. As shown by the graph, the Legendre coefficients are comparable to the optimal precoder coefficients. A receiving device may receive a communication that uses the Legendre precoder and may remove the Legendre precoder via postprocessing.

As indicated above, FIG. 4 is provided as an example. Other examples may differ from what is described with regard to FIG. 4.

Figure 5:
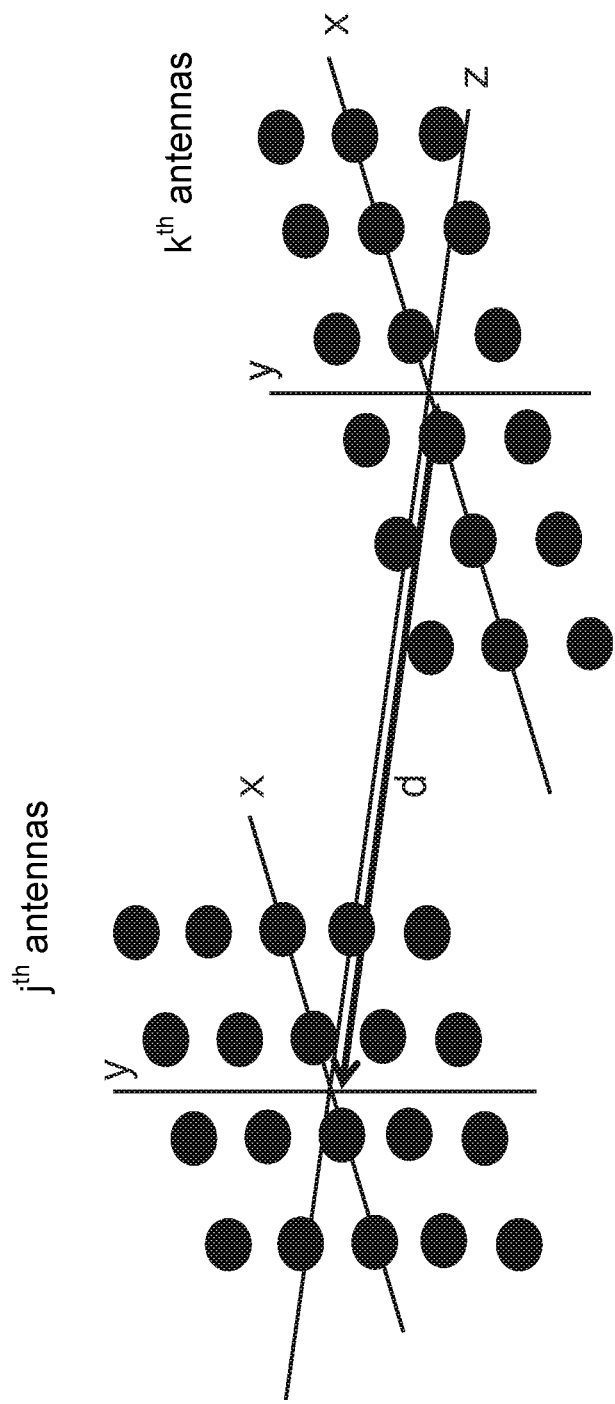
FIG. 5 is a diagram illustrating an example of two-dimensional antenna arrays, in accordance with the present disclosure.

FIG. 5 is a diagram illustrating an example 500 of two-dimensional antenna arrays, in accordance with the present disclosure.

Example 500 shows two antenna arrays that face each other in a clear LOS scenario between two wireless communication devices. A transmitting device may have $N_x$ transmit antennas in an x direction and $N_y$ transmit antennas in a y direction. A receiving device may have $M_x \times M_y$ receive antennas. Example 500 shows that the transmitting device has a two-dimensional array of four by five transmit antennas, and that the receiving device has a two-dimensional array of six by three receive antennas. The centers of the antenna arrays may aligned and separated by a distance d.

The Legendre precoder for a two-dimensional array may be a three-dimensional matrix, where each spatial mode corresponds to an $N_x \times N_y$ matrix. Spatial modes may be ordered (i,j) for i=0, 1, . . . , $N_x$−1 and j=0, 1, . . . $N_y$−1. To obtain a precoder for mode (i,j), represented by $P_{ij}$ the transmitting device may divide a first interval [−1 1] into $N_x$ equally separated points and compute a Legendre polynomial at each point on the first interval to form a first precoder vector. The transmitting device may divide a second interval [−1 1] into $N_y$ equally separated points and compute a Legendre polynomial at each point on the second interval to form a second precoder vector. The transmitting device may generate one or more precoder matrices based at least in part on a product of the first precoder vector and the second precoder vector. For example, if i=j, the transmitting device may determine a precoder matrix $P_{ii}$ using an equation of the form:

$$P_{ii} = p_i * p'_i$$

The term $p'_i$ may be a transpose of $p_i$. The transmitting device may normalize and/or orthogonalize the precoding matrix. If i≠j the transmitting device may generate a first precoder matrix based at least in part on a sum of an outer product of the first precoder vector and the second precoder vector. An example equation may be:

$$P_{ij} = p_i * p'_j + p_j * p'_i$$

The term $p'_j$ may be a transpose of $p_j$. The transmitting device may generate a second precoder matrix based at least in part on a difference of an outer product of the first precoder vector and the second precoder vector. An example equation may be:

$$P_{ji} = p_i * p'_j - p_j * p'_i$$

The transmitting device may also normalize and/or orthogonalize this precoding matrix. The Legendre precoder may be composed of one or more of the precoding matrices.

As indicated above, FIG. 5 is provided as an example. Other examples may differ from what is described with regard to FIG. 5.

Figure 6:
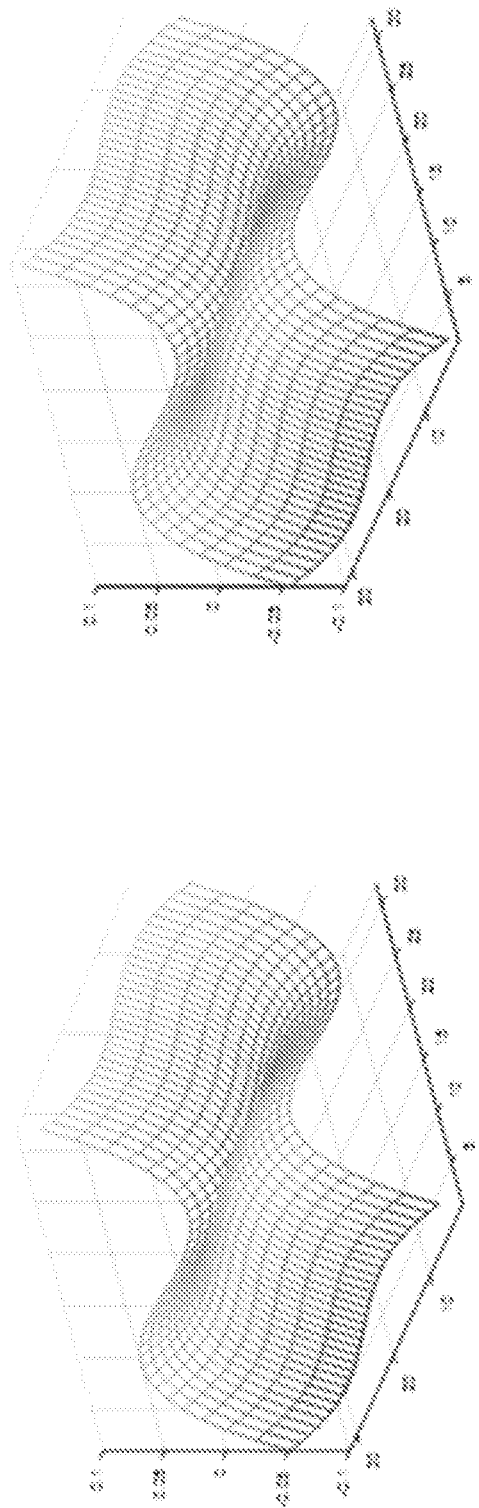
FIG. 6 is a diagram illustrating an example of a comparison of a Legendre precoder and an optimal recorder, in accordance with the present disclosure.

FIG. 6 is a diagram illustrating an example 600 of a comparison of a Legendre precoder and an optimal recorder, in accordance with the present disclosure.

Example 600 shows a graph comparison of a Legendre precoder and an optical precoder (derived from SVD) for a transmitting device with a two-dimensional antenna array. The graphs may have an ordering of the spatial modes as specified in FIG. 6. The optimal precoder may have an eigenmode of (0,3). As shown by the graphs, the Legendre coefficients are comparable to the optimal precoder coefficients, even for a two-dimensional antenna array.

As indicated above, FIG. 6 is provided as an example. Other examples may differ from what is described with regard to FIG. 6.

Figure 7:
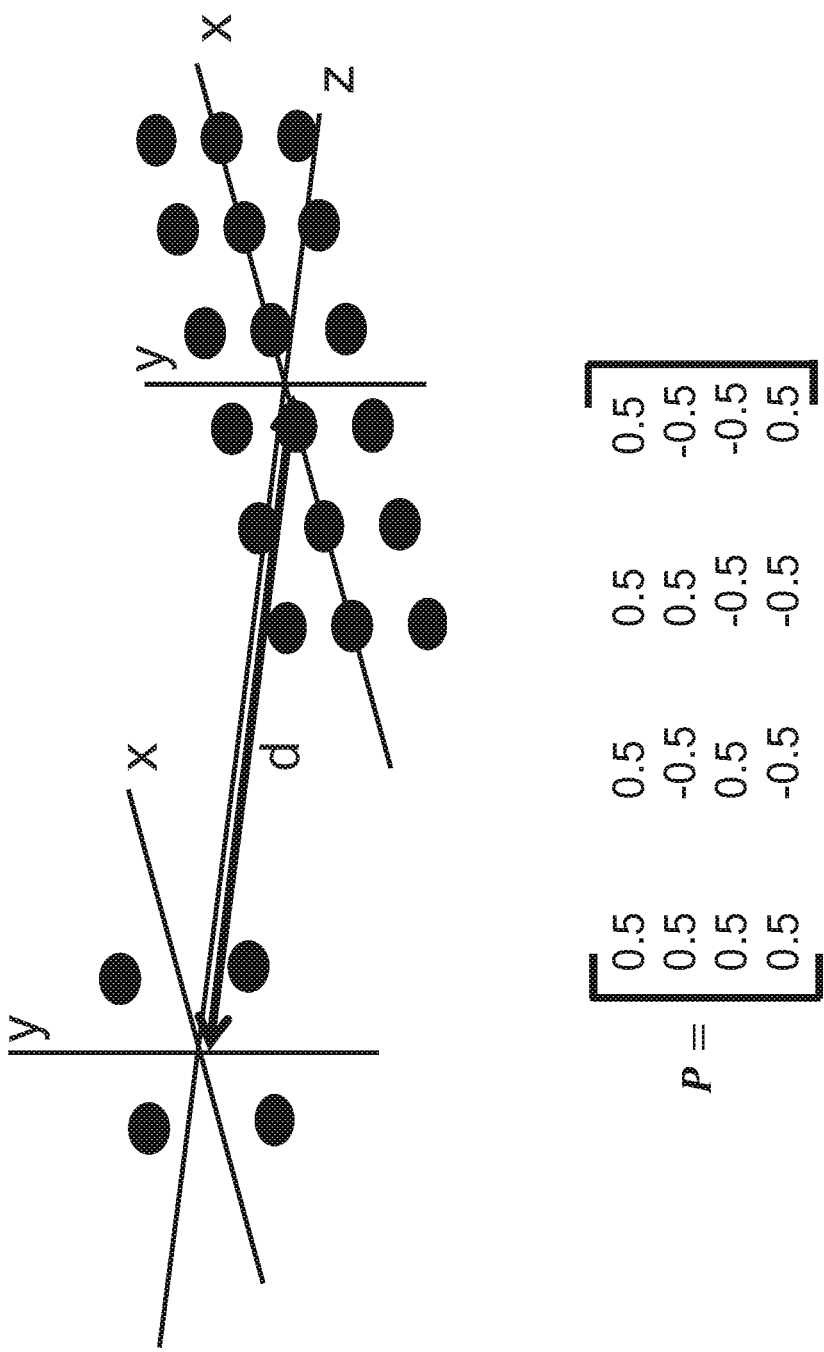
FIG. 7 is a diagram illustrating an example of a precoder for a special case, in accordance with the present disclosure.

FIG. 7 is a diagram illustrating an example 700 of a precoder for a special case, in accordance with the present disclosure.

Example 700 shows a special case, where the transmitter antenna array is a 2×2 array. In this case, the precoder for transmission may be:

$$P = \begin{bmatrix} .5 & .5 & .5 & .5 \\ .5 & -.5 & .5 & -.5 \\ .5 & .5 & -.5 & -.5 \\ .5 & -.5 & -.5 & .5 \end{bmatrix}.$$

This precoder may be comparable to an optimal precoder that is a Walsh matrix, and may be applicable for any distance beyond an aperture distance, including for intermediate and far field distances. As indicated above, FIG. 7 is provided as an example. Other examples may differ from what is described with regard to FIG. 7.

Figure 8:
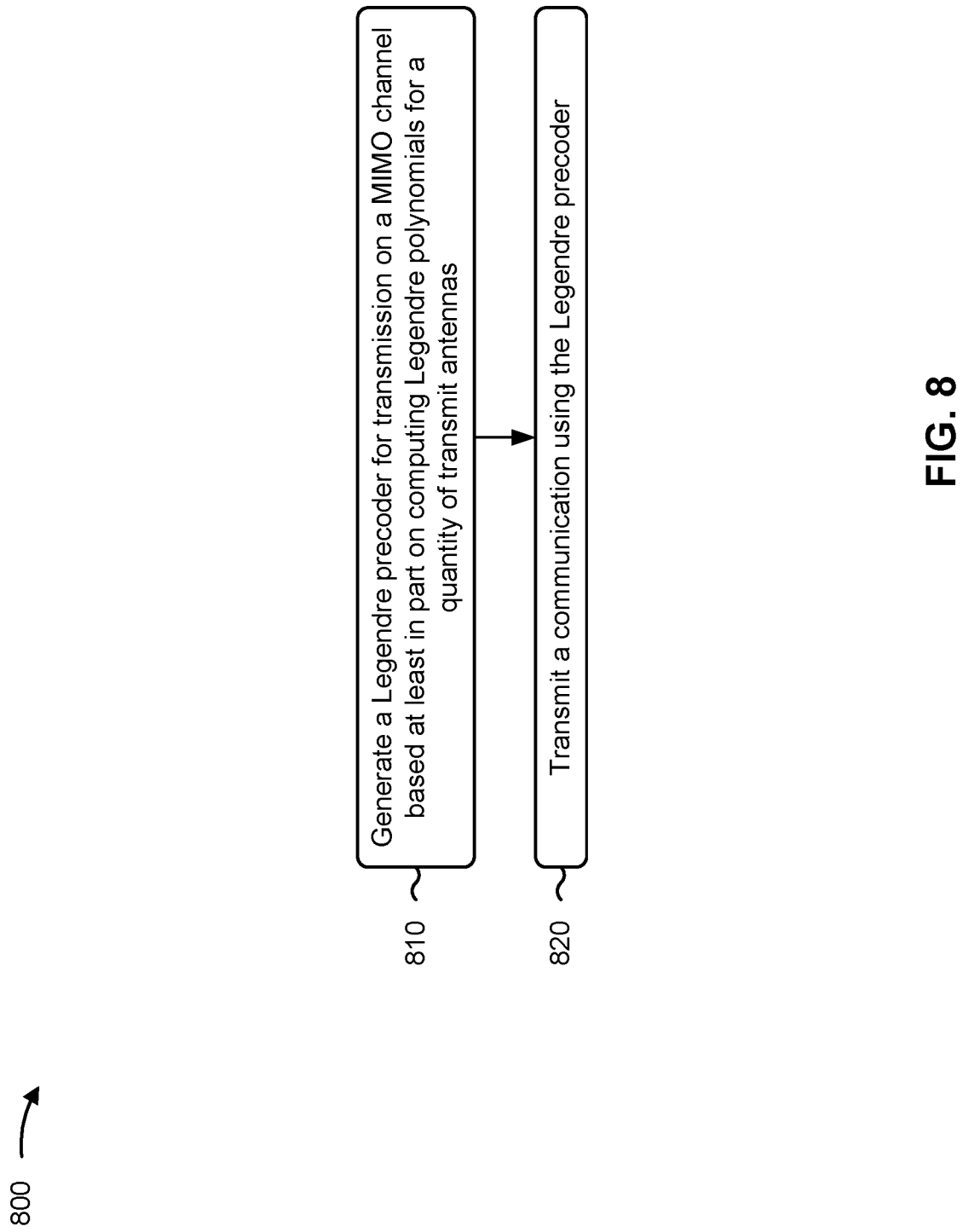
FIG. 8 is a diagram illustrating an example process performed, for example, by a wireless communication device, in accordance with the present disclosure.

FIG. 8 is a diagram illustrating an example process 800 performed, for example, by a wireless communication device, in accordance with the present disclosure. Example process 800 is an example where the wireless communication device (e.g., base station 110 or UE 120 depicted in FIGS. 1-2) performs operations associated with generation of spatial multiplexing modes for MIMO.

As shown in FIG. 8, in some aspects, process 800 may include generating a Legendre precoder for transmission on a MIMO channel based at least in part on computing Legendre polynomials for a quantity N of transmit antennas (block 810). For example, the wireless communication device (e.g., using generation component 908 depicted in FIG. 9) may generate a Legendre precoder for transmission on a MIMO channel based at least in part on computing Legendre polynomials for a quantity N of transmit antennas, as described above.

As further shown in FIG. 8, in some aspects, process 800 may include transmitting a communication using the Legendre precoder (block 820). For example, the wireless communication device (e.g., using transmission component 904 depicted in FIG. 9) may transmit a communication using the Legendre precoder, as described above. The Legendre precoder may be generated for LOS transmission.

Process 800 may include additional aspects, such as any single aspect or any combination of aspects described below and/or in connection with one or more other processes described elsewhere herein.

In a first aspect, computing the Legendre polynomials includes dividing an interval [−1 1] into N equally separated points, and computing a Legendre polynomial at each point on the interval to form a precoder matrix.

In a second aspect, alone or in combination with the first aspect, computing the Legendre polynomial at each point includes computing the Legendre polynomial according to an equation x=−1+k*2/(N−1), where x represents each point on the interval, and k is an index from 0 to N−1.

In a third aspect, alone or in combination with one or more of the first and second aspects, process 800 includes orthogonalizing the precoder matrix.

In a fourth aspect, alone or in combination with one or more of the first through third aspects, process 800 includes normalizing the precoder matrix based at least in part on an LOS channel estimate.

In a fifth aspect, alone or in combination with one or more of the first through fourth aspects, the precoder matrix includes multiple columns, and each column of the precoder matrix corresponds to a spatial mode associated with a data stream that is orthogonal to a data stream of another spatial mode of the precoder matrix.

In a sixth aspect, alone or in combination with one or more of the first through fifth aspects, the transmit antennas of the wireless communication device are arranged in a linear array.

In a seventh aspect, alone or in combination with one or more of the first through sixth aspects, each spatial mode of the Legendre precoder corresponds to a precoder vector derived from a Legendre polynomial computed for a particular degree.

In an eighth aspect, alone or in combination with one or more of the first through seventh aspects, the transmit antennas of the wireless communication device are arranged in a two-dimensional array.

In a ninth aspect, alone or in combination with one or more of the first through eighth aspects, each spatial mode of the Legendre precoder corresponds to a precoder matrix associated with a quantity Nx of transmit antennas in a first direction of the two-dimensional array and a quantity Ny of transmit antennas in a second direction of the two-dimensional array.

In a tenth aspect, alone or in combination with one or more of the first through ninth aspects, generating the precoder matrix includes dividing a first interval [−1 1] into $N_x$ equally separated points, computing a Legendre polynomial at each point on the first interval to form a first precoder vector, dividing a second interval [−1 1] into $N_y$ equally separated points, computing a Legendre polynomial at each point on the second interval to form a second precoder vector, and generating one or more precoder matrices based at least in part on a product of the first precoder vector and the second precoder vector.

In an eleventh aspect, alone or in combination with one or more of the first through tenth aspects, generating the one or more precoder matrices includes generating a first precoder matrix based at least in part on a sum of an outer product of the first precoder vector and the second precoder vector, and generating a second precoder matrix based at least in part on a difference of an outer product of the first precoder vector and the second precoder vector.

In a twelfth aspect, alone or in combination with one or more of the first through eleventh aspects, the precoder P for a 2×2 transmit antenna array is specified as $$P = \begin{bmatrix} .5 & .5 & .5 & .5 \\ .5 & -.5 & .5 & -.5 \\ .5 & .5 & -.5 & -.5 \\ .5 & -.5 & -.5 & .5 \end{bmatrix}.$$

In a thirteenth aspect, alone or in combination with one or more of the first through twelfth aspects, the wireless communication device is a UE.

In a fourteenth aspect, alone or in combination with one or more of the first through thirteenth aspects, the wireless communication device is a base station.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
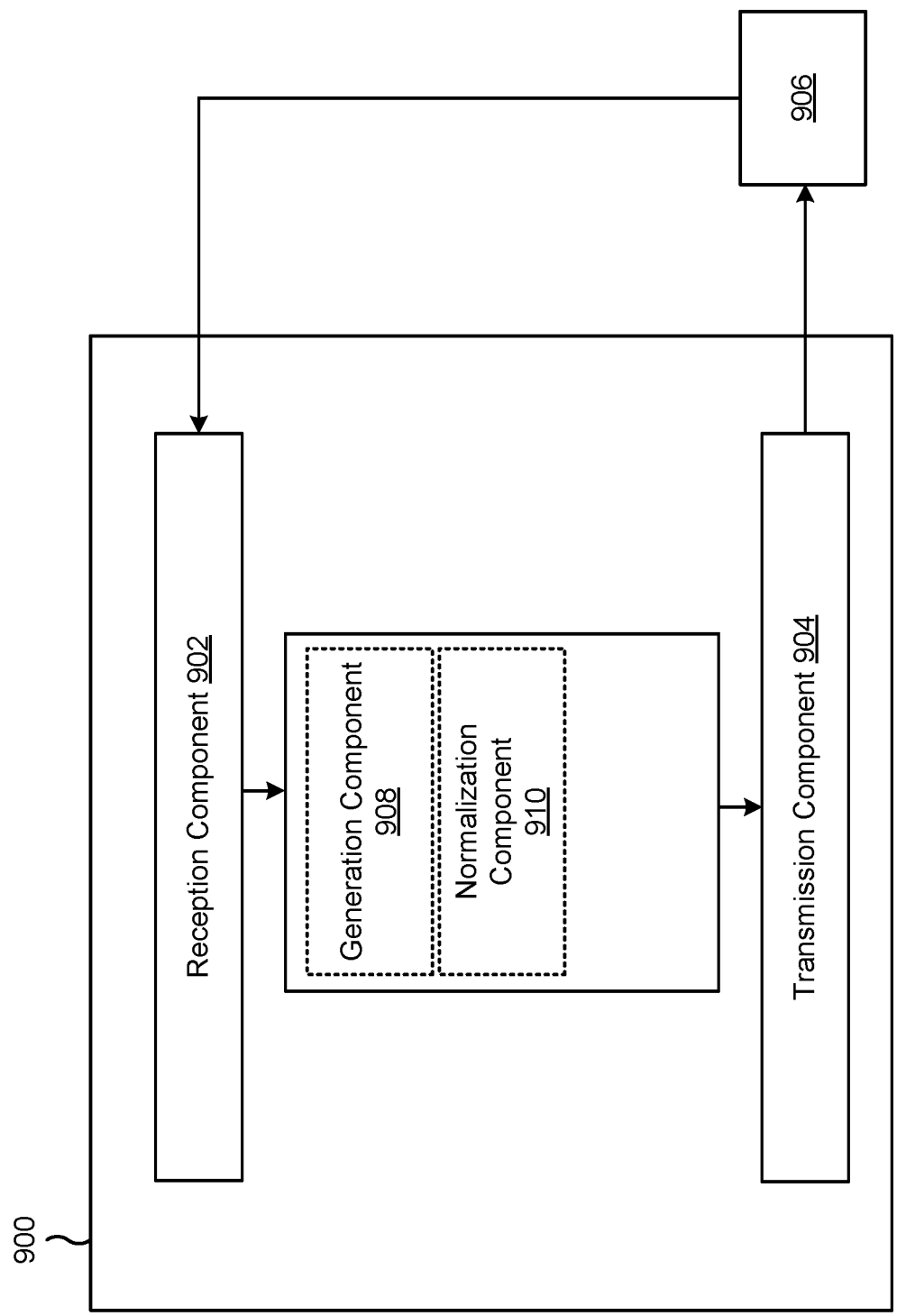
FIG. 9 is a block diagram of an example apparatus for wireless communication, in accordance with the present disclosure.

FIG. 9 is a block diagram of an example apparatus 900 for wireless communication. The apparatus 900 may be a wireless communication device (e.g., base station 110 or UE 120 depicted in FIG. 1-2), or a wireless communication device may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a generation component 908 and/or a normalization component 910, among other examples.

In some aspects, the apparatus 900 may be configured to perform one or more operations described herein in connection with FIG. 1-7. Additionally, or alternatively, the apparatus 900 may be configured to perform one or more processes described herein, such as process 800 of FIG. 8. In some aspects, the apparatus 900 and/or one or more components shown in FIG. 9 may include one or more components of the wireless communication device described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a demodulator, a MIMO detector, a receive processor, a controller/processor, a memory, or a combination thereof, of the wireless communication device described above in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the wireless communication device described above in connection with FIG. 2. In some aspects, the transmission component 904 may be co-located with the reception component 902 in a transceiver.

The generation component 908 may generate a Legendre precoder for transmission based at least in part on computing Legendre polynomials for a quantity N of transmit antennas. The transmission component 904 may transmit a communication using the Legendre precoder.

The normalization component 910 may normalize the precoder matrix based at least in part on an LOS channel estimate. The generation component 908 may orthogonalize the precoder matrix.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of aspects of the present disclosure:

Aspect 1: A method of wireless communication performed by a wireless communication device, comprising: generating a Legendre precoder for transmission on a multiple-input multiple-output channel based at least in part on computing Legendre polynomials for a quantity N of transmit antennas; and transmitting a communication using the Legendre precoder.

Aspect 2: The method of Aspect 1, wherein the Legendre precoder is generated for line of sight transmission.

Aspect 3: The method of Aspect 1 or 2, wherein computing the Legendre polynomials includes: dividing an interval [−1 1] into N equally separated points; and computing a Legendre polynomial of degree n at each point on the interval to form a precoder matrix.

Aspect 4: The method of Aspect 3, wherein computing the Legendre polynomial at each point includes computing the Legendre polynomial according to an equation: x=−1+k*2/(N−1), wherein x represents each point on the interval, and k is an index from 0 to N−1.

Aspect 5: The method of Aspect 3, further comprising orthogonalizing the precoder matrix.

Aspect 6: The method of Aspect 3, further comprising normalizing the precoder matrix based at least in part on a line of sight channel estimate.

Aspect 7: The method of Aspect 3, wherein the precoder matrix includes multiple columns, and wherein each column of the precoder matrix corresponds to a spatial mode associated with a data stream that is orthogonal to a data stream of another spatial mode of the precoder matrix.

Aspect 8: The method of any of Aspects 1-7, wherein the transmit antennas of the wireless communication device are arranged in a linear array.

Aspect 9: The method of Aspect 8, wherein each spatial mode of the Legendre precoder corresponds to a precoder vector derived from a Legendre polynomial computed for a particular degree.

Aspect 10: The method of any of Aspects 1-7, wherein the transmit antennas of the wireless communication device are arranged in a two-dimensional array.

Aspect 11: The method of Aspect 10, wherein each spatial mode of the Legendre precoder corresponds to a precoder matrix associated with a quantity Nx of transmit antennas in a first direction of the two-dimensional array and a quantity Ny of transmit antennas in a second direction of the two-dimensional array.

Aspect 12: The method of Aspect 11, wherein generating the precoder matrix for each spatial mode includes: dividing a first interval [−1 1] into Nx equally separated points; computing a Legendre polynomial at each point on the first interval to form a first precoder vector; dividing a second interval [−1 1] into Ny equally separated points; computing a Legendre polynomial at each point on the second interval to form a second precoder vector; and generating one or more precoder matrices based at least in part on a product of the first precoder vector and the second precoder vector.

Aspect 13: The method of Aspect 12, wherein generating the one or more precoder matrices includes: generating a first precoder matrix based on a sum of an outer product of the first precoder vector and the second precoder vector; and generating a second precoder matrix based on a difference of an outer product of the first precoder vector and the second precoder vector.

Aspect 14: The method of any of aspects 1-7 and 10-13, wherein the precoder P for a 2×2 transmit antenna array is specified as:

$$P = \begin{bmatrix} .5 & .5 & .5 & .5 \\ .5 & -.5 & .5 & -.5 \\ .5 & .5 & -.5 & -.5 \\ .5 & -.5 & -.5 & .5 \end{bmatrix}.$$

Aspect 15: The method of any of aspects 1-14, wherein the wireless communication device is a user equipment.

Aspect 16: The method of any of aspects 1-14, wherein the wireless communication device is a base station.

Aspect 17: An apparatus for wireless communication at a device, comprising a processor; memory coupled with the processor; and instructions stored in the memory and executable by the processor to cause the apparatus to perform the method of one or more aspects of aspects 1-16.

Aspect 18: A device for wireless communication, comprising a memory and one or more processors coupled to the memory, the memory and the one or more processors configured to perform the method of one or more aspects of aspects 1-16.

Aspect 19: An apparatus for wireless communication, comprising at least one means for performing the method of one or more aspects of aspects 1-16.

Aspect 20: A non-transitory computer-readable medium storing code for wireless communication, the code comprising instructions executable by a processor to perform the method of one or more aspects of aspects 1-16.

Aspect 21: A non-transitory computer-readable medium storing a set of instructions for wireless communication, the set of instructions comprising one or more instructions that, when executed by one or more processors of a device, cause the device to perform the method of one or more aspects of aspects 1-16.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware, firmware, and/or a combination of hardware and software.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A wireless communication device comprising:
a memory; and
one or more processors, coupled to the memory, configured to:
   generate a Legendre precoder for line of sight transmission on a multiple-input multiple-output channel based at least in part on computing Legendre polynomials for a quantity N of transmit antennas, wherein the quantity N is a positive integer greater than one; and
   transmit a communication using the Legendre precoder,
wherein the one or more processors, to compute the Legendre polynomials, are configured to:
   divide an interval [−1 1] into N equally separated points; and
   compute a Legendre polynomial of degree n at each point on the interval to form a precoder matrix.

2. The wireless communication device of claim 1, wherein the one or more processors, to compute the Legendre polynomial at each point, are configured to compute the Legendre polynomial according to an equation:

$$x = -1 + k * 2/(N-1),$$

wherein x represents each point on the interval, and k is an index from 0 to N−1.

3. The wireless communication device of claim 1, wherein the one or more processors are configured to orthogonalize the precoder matrix.

4. The wireless communication device of claim 1, wherein the one or more processors are configured to normalize the precoder matrix based at least in part on a line of sight channel estimate.

5. The wireless communication device of claim 4, wherein the line of sight channel estimate is based at least in part on a set of distances corresponding to distances between each of the transmit antennas and a plurality of receive antennas.

6. The wireless communication device of claim 1, wherein the precoder matrix includes multiple columns, and wherein each column of the precoder matrix corresponds to a spatial mode associated with a data stream that is orthogonal to a data stream of another spatial mode of the precoder matrix.

7. A wireless communication device comprising:
a memory; and
one or more processors, coupled to the memory, configured to:
   generate a Legendre precoder for line of sight transmission on a multiple-input multiple-output channel based at least in part on computing Legendre polynomials for a quantity N of transmit antennas, wherein the quantity N is a positive integer greater than one, wherein the transmit antennas of the wireless communication device are arranged in a linear array, and wherein each spatial mode of the Legendre precoder corresponds to a precoder vector derived from a Legendre polynomial computed for a particular degree; and
   transmit a communication using the Legendre precoder.

8. A wireless communication device comprising
a memory; and
one or more processors, coupled to the memory, configured to:
   generate a Legendre precoder for line of sight transmission on a multiple-input multiple-output channel based at least in part on computing Legendre polynomials for a quantity N of transmit antennas, wherein the quantity N is a positive integer greater than one, wherein the transmit antennas of the wireless communication device are arranged in a two-dimensional array, and wherein each spatial mode of the Legendre precoder corresponds to a precoder matrix associated with a quantity Nx of transmit antennas in a first direction of the two-dimensional array and a quantity Ny of transmit antennas in a second direction of the two-dimensional array wherein the quantity Nx is a positive integer and the quantity Ny is a positive integer; and
   transmit a communication using the Legendre precoder.

9. The wireless communication device of claim 8, wherein the one or more processors, to generate the precoder matrix for each spatial mode, are configured to:
   divide a first interval [−1 1] into Nx equally separated points;
   compute a Legendre polynomial at each point on the first interval to form a first precoder vector;
   divide a second interval [−1 1] into Ny equally separated points;
   compute a Legendre polynomial at each point on the second interval to form a second precoder vector; and
   generate one or more precoder matrices based at least in part on a product of the first precoder vector and the second precoder vector.

10. The wireless communication device of claim 9, wherein the one or more processors, to generate the one or more precoder matrices, are configured to:
   generate a first precoder matrix based on a sum of an outer product of the first precoder vector and the second precoder vector; and
   generate a second precoder matrix based on a difference of an outer product of the first precoder vector and the second precoder vector.

11. A wireless communication device, comprising:
a memory; and
one or more processors, coupled to the memory, configured to:

generate a Legendre precoder for line of sight transmission on a multiple-input multiple-output channel based at least in part on computing Legendre polynomials for a quantity N of transmit antennas, wherein the quantity N is a positive integer greater than one; and transmit a communication using the Legendre precoder;

wherein a Legendre precoder is indicated by P for a 2×2 transmit antenna array and is specified as:

$$P = \begin{bmatrix} .5 & .5 & .5 & .5 \\ .5 & -.5 & .5 & -.5 \\ .5 & .5 & -.5 & -.5 \\ .5 & -.5 & -.5 & .5 \end{bmatrix}.$$

12. A method of wireless communication performed by a wireless communication device, comprising:

generating a Legendre precoder for line of sight transmission on a multiple-input multiple-output channel based at least in part on computing Legendre polynomials for a quantity N of transmit antennas wherein the quantity N is a positive integer greater than one; and transmitting a communication using the Legendre precoder, wherein computing the Legendre polynomials includes:

dividing an interval [−1 1] into N equally separated points; and computing a Legendre polynomial of degree n at each point on the interval to form a precoder matrix.

13. The method of claim 12, wherein computing the Legendre polynomial at each point includes computing the Legendre polynomial according to an equation:

$$x = -1 + k*2/(N-1),$$

wherein x represents each point on the interval, and k is an index from 0 to N−1.

14. The method of claim 12, further comprising orthogonalizing the precoder matrix.

15. The method of claim 12, further comprising normalizing the precoder matrix based at least in part on a line of sight channel estimate.

16. The method of claim 15, wherein the line of sight channel estimate is based at least in part on a set of distances corresponding to distances between each of the transmit antennas and a plurality of receive antennas.

17. The method of claim 12, wherein the precoder matrix includes multiple columns, and wherein each column of the precoder matrix corresponds to a spatial mode associated with a data stream that is orthogonal to a data stream of another spatial mode of the precoder matrix.

18. A method of wireless communication performed by a wireless communication device, comprising:

generating a Legendre precoder for line of sight transmission on a multiple-input multiple-output channel based at least in part on computing Legendre polynomials for a quantity N of transmit antennas wherein the quantity N is a positive integer greater than one; and transmitting a communication using the Legendre precoder, wherein the transmit antennas of the wireless communication device are arranged in a linear array, and wherein each spatial mode of the Legendre precoder corresponds to a precoder vector derived from a Legendre polynomial computed for a particular degree.

19. A method of wireless communication performed by a wireless communication device, comprising:

generating a Legendre precoder for line of sight transmission on a multiple-input multiple-output channel based at least in part on computing Legendre polynomials for a quantity N of transmit antennas wherein the quantity N is a positive integer greater than one; and transmitting a communication using the Legendre precoder, wherein the transmit antennas of the wireless communication device are arranged in a two-dimensional array, and wherein each spatial mode of the Legendre precoder corresponds to a precoder matrix associated with a quantity $N_x$ of transmit antennas in a first direction of the two-dimensional array and a quantity $N_y$ of transmit antennas in a second direction of the two-dimensional array, wherein the quantity Nx is a positive integer and the quantity Ny is a positive integer.

20. The method of claim 19, wherein generating the precoder matrix for each spatial mode includes:

dividing a first interval [−1 1] into $N_x$ equally separated points;

computing a Legendre polynomial at each point on the first interval to form a first precoder vector;

dividing a second interval [−1 1] into $N_y$ equally separated points;

computing a Legendre polynomial at each point on the second interval to form a second precoder vector; and generating one or more precoder matrices based at least in part on a product of the first precoder vector and the second precoder vector.

21. The method of claim 20, wherein generating the one or more precoder matrices includes:

generating a first precoder matrix based on a sum of an outer product of the first precoder vector and the second precoder vector; and generating a second precoder matrix based on a difference of an outer product of the first precoder vector and the second precoder vector.

22. A method of wireless communication performed by a wireless communication device, comprising:

generating a Legendre precoder for line of sight transmission on a multiple-input multiple-output channel based at least in part on computing Legendre polynomials for a quantity N of transmit antennas wherein the quantity N is a positive integer greater than one; and transmitting a communication using the Legendre precoder, wherein a Legendre precoder P is indicated by for a 2×2 transmit antenna array and is specified as:

$$P = \begin{bmatrix} .5 & .5 & .5 & .5 \\ .5 & -.5 & .5 & -.5 \\ .5 & .5 & -.5 & -.5 \\ .5 & -.5 & -.5 & .5 \end{bmatrix}.$$

* * * * *